US010706157B1

(12) United States Patent
Jenkins et al.

(10) Patent No.: US 10,706,157 B1
(45) Date of Patent: Jul. 7, 2020

(54) FACILITATING RETURN OF A MISSING USER DEVICE TO A DEVICE OWNER

(71) Applicant: Amazon Technologies, Inc., Seattle, WA (US)

(72) Inventors: Jonathan A. Jenkins, Seattle, WA (US); Joseph E. Fitzgerald, Seattle, WA (US); Hannah R. Lewbel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 165 days.

(21) Appl. No.: 16/031,984

(22) Filed: Jul. 10, 2018

Related U.S. Application Data

(60) Continuation of application No. 13/734,865, filed on Jan. 4, 2013, now abandoned, which is a division of application No. 12/858,374, filed on Aug. 17, 2010, now Pat. No. 8,370,168.

(51) Int. Cl.
*G06F 21/60* (2013.01)

(52) U.S. Cl.
CPC .................................... *G06F 21/60* (2013.01)

(58) Field of Classification Search
CPC ........ G06F 21/60; G06F 21/88; G06F 21/554; H04W 76/50; H04W 4/12; H04W 4/90; G06Q 30/02; H04M 3/42008
USPC ........................................................... 705/39
See application file for complete search history.

(56) References Cited

U.S. PATENT DOCUMENTS

| | | | |
|---|---|---|---|
| 8,370,168 | B1 | 2/2013 | Jenkins et al. |
| 2002/0013744 | A1 | 1/2002 | Tsunenari et al. |
| 2003/0149666 | A1 | 8/2003 | Davies |
| 2004/0049396 | A1 | 3/2004 | Hope |
| 2005/0114270 | A1 | 5/2005 | Hind et al. |
| 2006/0187857 | A1 | 8/2006 | Imai et al. |
| 2009/0187433 | A1 | 7/2009 | Nudd |
| 2009/0249443 | A1 | 10/2009 | Fitzgerald et al. |
| 2009/0249460 | A1 | 10/2009 | Fitzgerald et al. |
| 2010/0240403 | A1 | 9/2010 | Yu et al. |

*Primary Examiner* — Igor N Borissov
(74) *Attorney, Agent, or Firm* — Lowenstein Sandler LLP

(57) ABSTRACT

A server identifies a user device that is missing, communicates with the user device and causes the user device to disable access to content stored on the user device, and to generate a message that includes information facilitating return of the user device to an owner of the user device.

20 Claims, 9 Drawing Sheets

FACILITATING RETURN OF A MISSING USER DEVICE TO A DEVICE OWNER

RELATED APPLICATIONS

This is a Continuation of U.S. patent application Ser. No. 13/734,865, filed Jan. 4, 2013, which is a Divisional of U.S. patent application Ser. No. 12/858,374, filed Aug. 17, 2010, now U.S. Pat. No. 8,370,168, both of which are incorporated herein by reference.

BACKGROUND

A large and growing population of users is enjoying entertainment through the consumption of digital media items, such as music, movies, images, electronic books, and so on. The users employ various electronic devices to consume such media items. Among these electronic devices are electronic book readers, cellular telephones, personal digital assistants (PDAs), portable media players, tablet computers, netbooks, and the like. Due to improved network connectivity and the portability of electronic devices, it has become common for the users to carry their devices with them anywhere they go, including buses, trains, airplanes, restaurants, bars, hotels, shops, libraries, beaches, etc. Hence, there is a higher chance that a user device can be lost or stolen while a user is away from home.

FIELD OF INVENTION

Embodiments of the invention relate to user devices, and more particularly, to facilitating return of a missing user device to a device owner.

BACKGROUND OF THE INVENTION

A large and growing population of users is enjoying entertainment through the consumption of digital media items, such as music, movies, images, electronic books, and so on. The users employ various electronic devices to consume such media items. Among these electronic devices are electronic book readers, cellular telephones, personal digital assistants (PDAs), portable media players, tablet computers, netbooks, and the like. Due to improved network connectivity and the portability of electronic devices, it has become common for the users to carry their devices with them anywhere they go, including buses, trains, airplanes, restaurants, bars, hotels, shops, libraries, beaches, etc. Hence, there is a higher chance that a user device can be lost or stolen while a user is away from home.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Methods and systems for facilitating return of a missing user device to a device owner are described. A user device may be any mobile device that can connect to a network. Examples of such user devices include electronic book readers, cellular telephones, personal digital assistants (PDAs), portable media players, tablet computers, netbooks, and the like. A user device may connect to a network to obtain content from a server (e.g., an item providing system) or to perform other activities.

In one embodiment, a server (e.g., an item providing system) identifies a user device that is missing (e.g., upon receiving an indication from an owner of the user device). The server then communicates with the user device and causes the user device to disable access to the content stored on the user device, and to generate a message including information that facilitates return of the user device to the owner of the user device. For example, the message may identify a return address such as the address of the owner of the user device or the address of an intermediate entity (e.g., the address associated with the item providing system). In some embodiments, a current user is not only prevented from accessing the content stored on the user device but also from operating the user device in any other way except for a set of operations that are directed to the return of the user device to its owner.

In one embodiment, a user device includes a control element (e.g., on the screen of the user device) that allows a current user of the user device to indicate that he or she has found the user device. In response to an activation of the control element, the user device notifies the server that the user device was found by the current user. In response, the user device receives, from the server, information that facilitates return of the user device to its owner, and provides the information that facilitates return of the user device to the user.

In one embodiment, the server stores records of transfers of ownership for multiple user devices. Upon identifying a user device that is missing, the server checks these records to ensure that a user who reported the user device as missing is a rightful owner of the user device.

Accordingly, a convenient mechanism is provided that automatically generates a message for a missing user device to enable return of the missing user device to its owner. The message can be generated when the device owner reports the user device as missing or when a current user of the user device activates a control element on the user device to indicate that he or she has found the user device. This mechanism can be further optimized to distinguish between a user device that was lost or stolen and a user device that was intentionally transferred by its owner to another individual or entity.

Figure 1:
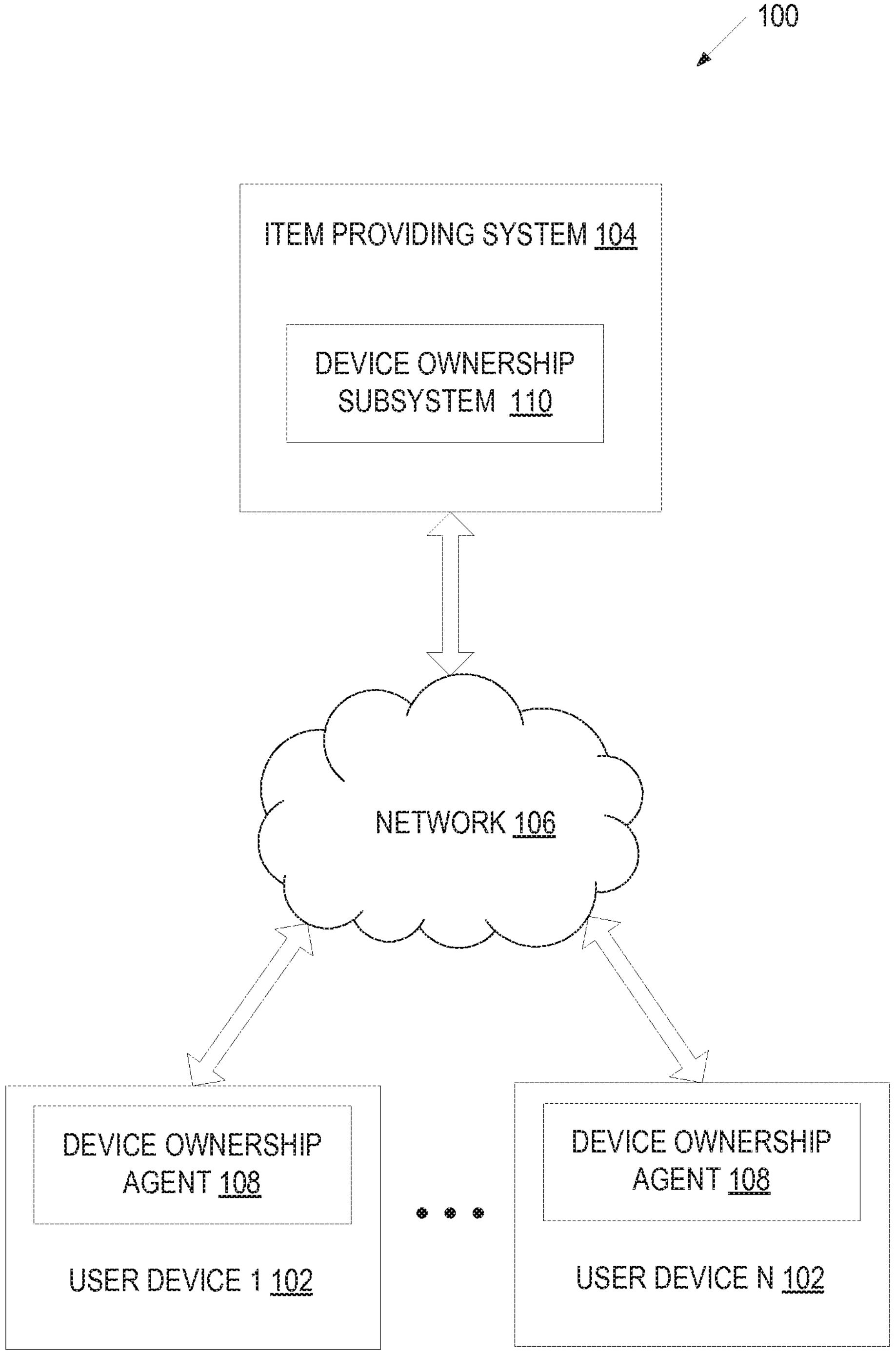
FIG. 1 is a block diagram of an exemplary network architecture in which embodiments of the invention may operate.

FIG. 1 is a block diagram of exemplary network architecture 100 in which embodiments of the invention may operate. The network architecture 100 may include an item providing system 104 and multiple user devices 102 coupled to the item providing system 104 via a network 106 (e.g., public network such as the Internet or private network such as a local area network (LAN)).

The user devices 102 are variously configured with different functionality and may include various mobile computing devices such as electronic book readers, portable digital assistants, mobile phones, laptop computers, portable media players, tablet computers, cameras, video cameras, netbooks, notebooks, desktop computers, gaming consoles, DVD players, media centers, and the like. In some embodiments, the user devices 102 are configured to enable consumption of one or more types of media items including, for example, electronic texts (e.g., eBooks, electronic magazines, digital newspapers), digital audio (e.g., music, audible books), digital video (e.g., movies, television, short clips), images (e.g., art, photographs), and multi-media content.

The item providing system 104 downloads items, upgrades, and/or other information to the user devices 102 registered with the item providing system 104 via the network 106. The item providing system 104 also receives various requests, instructions and other data from the user devices 102 via the network 106. The item providing system 104 may include one or more machines (e.g., one or more server computer systems, routers, gateways) that have processing and storage capabilities to provide the above functionality.

Communication between the item providing system 104 and a user device 102 may be enabled via any communication infrastructure. One example of such an infrastructure includes a combination of a wide area network (WAN) and wireless infrastructure, which allows a user to use the user device 102 to purchase items and consume items without being tethered to the item providing system 104 via hardwired links. The wireless infrastructure may be provided by a wireless carrier system that can be implemented using various data processing equipment, communication towers, etc. Alternatively, or in addition, the wireless carrier system may rely on satellite technology to exchange information with the user device 102. Yet alternatively, the wireless infrastructure may be provided by an access point (e.g., WiFi access point) provider system.

The communication infrastructure may also include a communication-enabling system that serves as an intermediary in passing information between the item providing system 104 and the wireless carrier. The communication-enabling system may communicate with the wireless carrier via a dedicated channel, and may communicate with the item providing system 104 via a non-dedicated communication mechanism, e.g., a public network such as the Internet.

A current user of the user device 102 can de-register the user device 102 and re-register it with the item providing system 104 in the current user's name, even if the current user is not a rightful owner of the user device 102 (e.g., if the user device 102 was lost by the rightful owner or stolen from the rightful owner). The item providing system 104 provides a mechanism that facilitates return of the user device 102 to its owner by the current user of the user device 102. In one embodiment, the item providing system 104 includes a device ownership subsystem 110 that identifies the user device 102 as missing upon receiving an indication from the owner of the user device 102. This indication may be provided by, for example, the owner connecting to a website of the item providing system 104 (via a personal computer) and changing the mode of the user device 102 to a missing mode (e.g., a lost or stolen mode). In another example, the device owner can provide an indication via other means such as email, instant messaging or phone (e.g., by contacting customer support of the item providing system 104).

The device ownership subsystem 110 then communicates with the user device 102 via the network 106 and instructs the user device 102 to disable access to the content stored on the user device 102 and disable the remaining functionality of the user device 102 except for a set of functions that facilitate return of the user device to its owner. In addition, the device ownership subsystem 110 causes the user device 102 to generate a message that includes information facilitating return of the user device 102 to its owner and communicates this message to the user device 102. The message may specify, for example, a return address such as the address of the owner of the user device 102 or the address of an intermediate entity (e.g., the address associated with the item providing system 104). The message may also optionally specify a reward that will be paid for the return of the user device. The reward may be predefined or configured by the owner of the user device 102. The message can be, for example, a text message to be presented on the screen of the user device 102, or an audio or video message to be provided to a current user of the user device 102 (e.g., when the current user attempts to activate the user device 102).

In some embodiments, the device ownership subsystem 110 records transfers of ownership for various user devices 102. When a user device is reported as missing, the device ownership subsystem 110 checks the transfer of ownership data to ensure that a user who reported the user device as missing is a rightful owner of the user device. The device ownership subsystem 110 can also use the transfer of ownership data to prevent reselling of lost or stolen user devices 102, as will be discussed in more detail below.

In one embodiment, the user device 102 includes a device ownership agent 108 allowing a current user of the user device 102 to notify the item providing system 104 that he or she has found the user device 102. In particular, the user device 102 may include a control element (e.g., a button or a menu item on the screen of the user device 102, or a physical key or button on the user device 102) that can be activated by the current user to indicate that he or she has found the user device 102. Upon the activation of the control element, the device ownership agent 108 notifies the item providing system 104 that the user device 104 was found by the current user. In response, the device ownership agent 108 receives, from the item providing system 104, information that facilitates return of the user device 102 to its owner, and provides this information to the current user of the user device 102 (e.g., as a text message displayed on the screen of the user device 102, or an audio or video message played upon activation of the user device 102).

As will be discussed in more detail below, the device ownership subsystem 110 and the device ownership agent 108 can provide other features that further facilitate return of user devices 102 to their owners.

Figure 2:
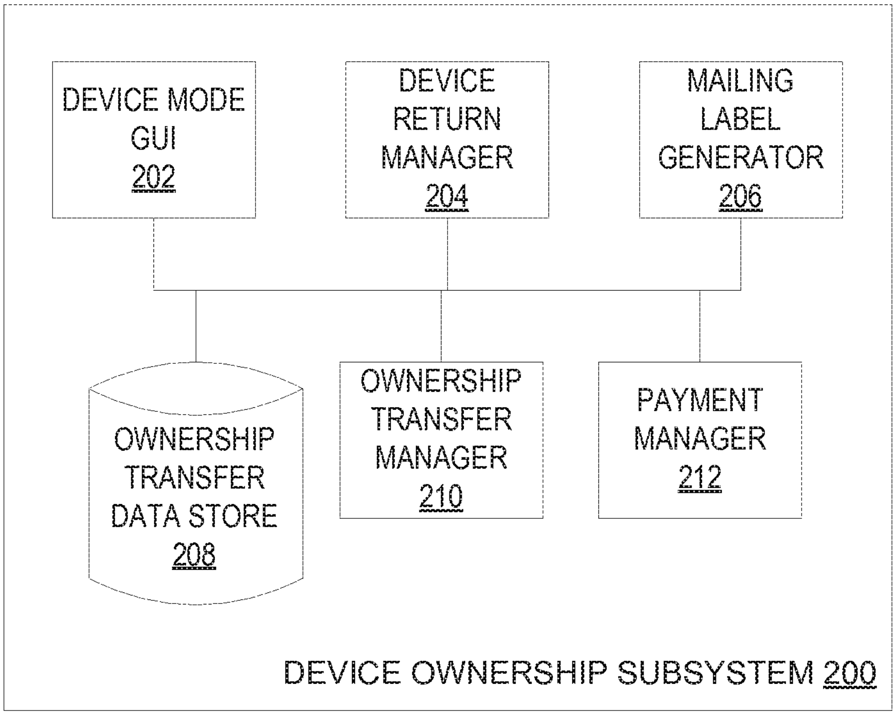
FIG. 2 is a block diagram of one embodiment of a device ownership subsystem.

FIG. 2 is a block diagram of one embodiment of a device ownership subsystem 200. The device ownership subsystem 200 may be the same as the device ownership subsystem 110 of FIG. 1 and may include a device mode graphical user interface (GUI) 202, a device return manager 204, a mailing label generator 206, an ownership transfer manager 210, a payment manager 212, and an ownership transfer data store 208. The components of the device ownership subsystem 200 may represent modules that can be combined together or separated into further modules, according to some embodiments.

The device mode GUI 202 allows a user to change the mode of a user device. The device mode GUI 202 may be displayed when, for example, a user enters information identifying the user account, select a user device associated with the user account, and activates a device mode option for the user device. The device mode GUI 202 may present a list of available modes and allow a user to select a desired mode from the list. For example, a user may choose a missing device mode from the list if the user device has been lost or stolen. In another example, a user may choose a transit mode from the list if the user is shipping a device to a different user (e.g., when the user sells the user device or returns the user device to the device owner).

The device return manager 204 identifies a user device that is missing upon detecting that the user device mode has changed to a missing mode (e.g., via the device mode GUI 202) or upon receiving an indication from the user via other means (e.g., email, instant messaging, phone or any other means). Then, the device return manager 204 communicates with the user device to lock the user device. The device return manager 204 may communicate with the user device upon remotely connecting to the user device (e.g., via a wireless network if the user device is in the wireless mode) or by waiting until the user device attempts to connect to the item providing system 104 (e.g., when the user device periodically calls "home"). The device return manager 204 may lock the user device by instructing the user device to disable access to the content stored on the user device (e.g., preventing a user from selecting menu options or control elements that provide access to data stored on the user device) or to disable all functionality of the user device 102 except for a set of functions that facilitate return of the user device to its owner.

The device return manager 204 may also send to the user device a message that facilitates return of the user device to its owner. The message may indicate that this user device has been reported as lost or stolen and can specify a return address, which may be the address of the device owner or the address of an intermediate entity (e.g., the item providing system 104) that will be responsible for transferring the user device to the device owner (e.g., to avoid direct interaction between the device owner and a person who found the user device). In addition, the message may optionally specify a reward for the return of the user device to the device owner. The reward may be predefined or configured by the device owner. The reward may be, for example, in the form of a check or a credit towards a product or service offered by the item providing system 104.

Mailing label generator 206 is responsible for identifying a shipping carrier office (e.g., a UPS office, a FedEx office, or a US post office) near the current location of the user device, generating a mailing label for the identified mailing carrier office, and delivering the mailing label for use in the shipment of the user device. The mailing label generator 206 may identify the current location of the user device using triangulation or other location detection techniques or by requesting it from the user device which can determine its location using a local GPS system, triangulation, mobile country code (MCC) and a mobile network code (MNC) data, etc. The mailing label generator 206 may send the label to the user device (e.g., for display on the screen of the user device), to an email address provided by the user who found the user device, to the identified shipping carrier office so that they can print it and have it ready for shipment of the user device, etc.

The ownership transfer data store 208 stores data identifying rightful owners of various user devices (e.g., individuals who bought new user devices). Subsequently, the ownership transfer manager 210 stores records of transfers of ownership of user devices in the ownership transfer data store 208. An ownership transfer record can be created upon receiving an indication that the current owner intends to transfer the user device to another individual or entity. The current owner can provide this indication by disabling the missing device mode for a predefined time period (e.g., 3 weeks), registering the transfer at a designated website and providing identifying information for a new owner (e.g., email address of the new owner), registering the transfer and receiving a code associated with the transfer, etc. An ownership transfer record may include an identifier of a user device being transferred, an identifier of a current owner, and optionally an identifier of a new owner or a code associated with the transfer. The data store 208 may represent a single or multiple data structures (databases, repositories, files, etc.) residing on one or more mass storage devices, such as magnetic or optical storage based disks, tapes or hard drives.

The ownership transfer manager 210 uses the ownership transfer records to determine whether a particular transfer of ownership was intended by the device owner. Specifically, in one embodiment, the ownership transfer manager 210 detects that a user attempts to re-register a user device in his or her name (e.g., by selecting a relevant option on the screen of the user device, by connecting to a website of the item providing system 104 via a personal computer, or by utilizing any other means), and determines whether this transfer of ownership was intended by the owner of the user device using the data stored in the ownership transfer data store 208. If so, the ownership transfer manager 210 record this transfer as valid. If not, the ownership transfer manager 210 invokes the device return manager 204 to lock the user device and send a message that facilitates return of the user device to the device owner.

The payment manager 212 delivers rewards for returned user devices. In some embodiments, the payment manager 212 transfers the reward upon determining that a user device has been shipped by a person who found the user device (i.e., the device is in transit). The payment manager 204 may determine that the user device is in transit based on the current location of the user device and/or upon detecting that the mode of the user device has been changed to a transit mode.

In one embodiment, the payment manager 212 also provides payments for sold user devices. In particular, the payment manager 212 may receive a payment from a buyer of a user device and may determine whether a current location of this user device and/or its mode indicates that the user device is in transit. If so, the payment manager 212 provides a payment to the seller of the user device and updates the ownership transfer data store 208 to specify that the transfer of the user device from the seller to the buyer as a valid transfer of ownership. If the user device is not in transit yet, the payment manager 212 waits until receiving an indication that the user device is in transit. In one embodiment, upon receiving a payment from the buyer, the payment manager 212 checks the ownership transfer data store 208 to verify that the seller of the user device is the rightful owner of the user device. If not, the payment manager 212 can notify the buyer about it or perform other actions to prevent sale of lost or stolen user devices.

Figure 3:
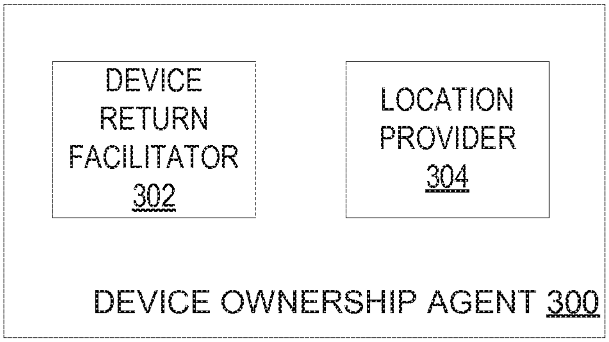
FIG. 3 is a block diagram of one embodiment of a device ownership agent.

FIG. 3 is a block diagram of one embodiment of a device ownership agent 300. The device ownership agent 300 may be the same as device ownership agent 108 of FIG. 1 and may include a device return facilitator 302 and a location provider 304. The components of the device ownership agent 300 may represent modules that can be combined together or separated into further modules, according to some embodiments.

A user device hosting the device ownership agent 300 may include a control element that facilitates return of the user device to its rightful owner. For example, when a person finds a user device, he or she can activate a control element to indicate that the user device has been found. A control element may be a button, a menu option, etc. on a GUI displayed on the screen of the user device or it may be a physical element such as a key or button on the user device (e.g., on the front panel of the user device, on the back panel of the user device, on the top or bottom of the user device, or on either side of the user device).

When a user activates the control element to indicate that he or she has found the user device, the device return facilitator 302 notifies the item providing system 104 that the user device was found. In response, the item providing system 104 provides information that facilitates return of the user device to its owner. This information may include a return address, which may be the address of the device owner or the address of an intermediate entity (e.g., the item providing system 104), and optionally a reward for the return of the user device. The device return facilitator 302 provides this information to the user (e.g., displays it as a text message on the screen of the user device, plays it as an audio message, or plays it as a video message on the screen of the user device).

In addition, in one embodiment, the device return facilitator 302 receives, from the item providing system 104, the location of a shipping carrier office near the current location of the user device. The current location of the user device can be determined by the item providing system 104 or it can be determined by the location provider 304 (using GPS, triangulation, MCC and MNC data, etc.) and sent to the item providing system 104. The device return facilitator 302 may also receive a mailing label for the return of the user device and display it on the screen of the user device. Alternatively, the device return facilitator 302 may ask the user who found the user device to provide his or her email address, and the item providing system 104 may send the mailing label to the email address of the user. Yet alternatively, the item providing system 104 may send the mailing label to the shipping carrier office.

In one embodiment, the user device includes a control element that allows the user to change the mode of the user device to a transit mode when the user decides to ship the user device to its owner or some other party. This control element can be a GUI element such as a button or a menu item, or a physical element such as a key or button on the user device (e.g., on the front panel of the user device, on the back panel of the user device, on the top or bottom of the user device, or on either side of the user device).

Figure 4:
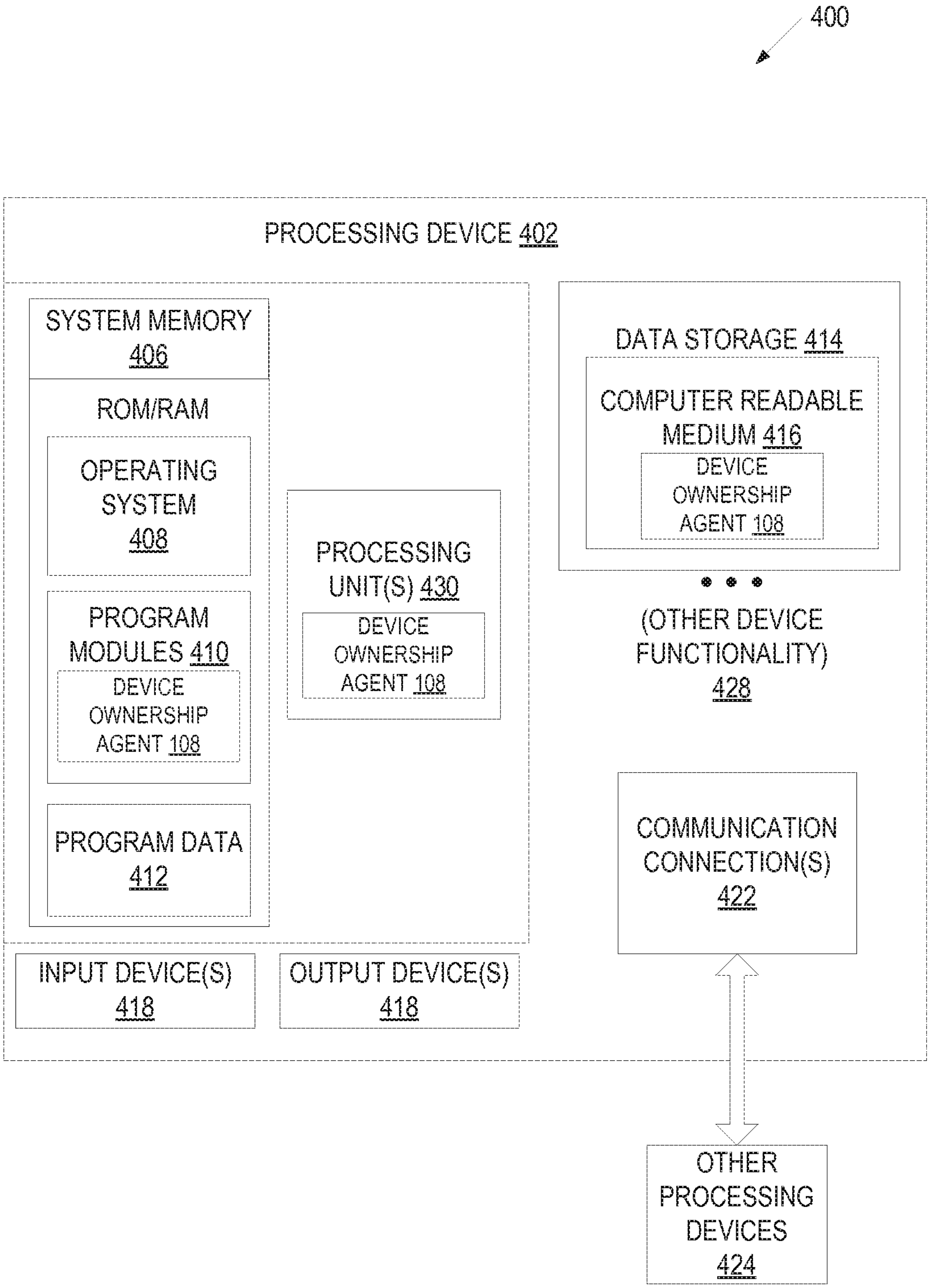
FIG. 4 is a block diagram illustrating an exemplary user device.

FIG. 4 is a block diagram illustrating an exemplary user device 400. The user device 400 may be the same as user device 102 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 400 includes one or more processing units 404, such as one or more CPUs. The user device 400 also includes system memory 406, which may correspond to any combination of volatile and/or non-volatile storage mechanisms. The system memory 406 may store information which provides an operating system component 408, various program modules 410 including device ownership agent 108, program data 412, and/or other components. The user device 400 performs functions by using the processing unit(s) 404 to execute the device ownership agent 108 and other instructions provided by the system memory 406.

The user device 400 may also include a data storage device 414 that may consist of one or more types of removable storage and/or one or more types of non-removal storage. The data storage device 414 may include a computer-readable medium 416 on which is stored one or more sets of instructions (e.g., instructions of the device ownership agent 108) embodying any one or more of the methodologies or functions described herein. As shown, instructions of the device ownership agent 108 may also reside, completely or at least partially, within the system memory 406 and/or within the processing unit(s) 430 during execution thereof by the user device 400, the system memory 406 and the processing unit(s) 430 also constituting computer-readable media. The instructions of the device ownership agent 108 may further be transmitted or received over a network.

The user device 400 may also include one or more input devices 418 (keyboard, mouse device, specialized selection keys, etc.) and one or more output devices 420 (displays, printers, audio output mechanisms, etc.). The user device 400 may further include one or more communication interface mechanisms 422. These communication interface mechanisms 422 allow the user device 400 to interact with other processing devices 424, such as remote computers, the item providing system, and so forth. The communication interface mechanisms 422 may allow the user device 400 to receive a telephone ring and also communicate with the item providing system in a data mode.

The above-enumerated list of modules is representative and is not exhaustive of the types of functions performed by the user device 400. As indicated by the label "Other Device Functionality" 428, the user device 400 may include additional functions.

FIGS. 5A, 5B, 6A, 6Bm 7 and 8 illustrate methods performed in accordance with various embodiments of the invention. The methods are performed by processing logic that may comprise hardware (circuitry, dedicated logic, etc.), software (such as is run on a general purpose computer system or a dedicated machine), or a combination of both.

Figure 5A:
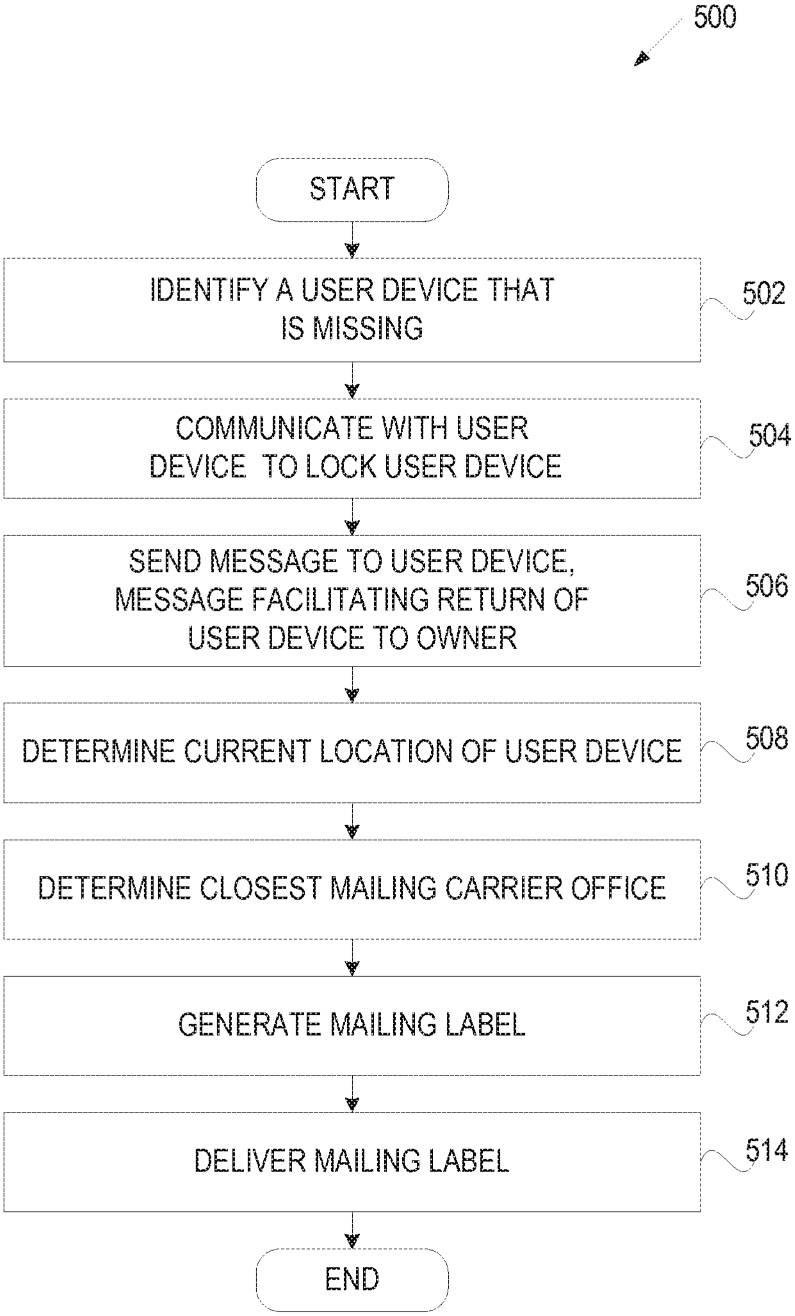
FIG. 5A is a flow diagram of one embodiment of a server-based method for facilitating return of a missing user device to a device owner.

FIG. 5A is a flow diagram of one embodiment of a server-based method 500 for facilitating return of a user device. In one embodiment, the method 500 is performed by a server (e.g., item providing system 104 of FIG. 1).

Referring to FIG. 5A, method 500 starts when the server identifies a user device that is missing (block 502). The server may identify a missing user device upon detecting that the mode of a user device has been set to a missing (e.g., lost or stolen) mode, or upon receiving an indication from the device owner via other means (e.g., email, instant messaging, phone). In some embodiments, the owner of the user device has an option of requesting that the mode of the user device be automatically changed to a missing mode when the user device moves outside of a specific geographic area or a predefined distance from a certain location. For example, the owner of the user device who very rarely travels outside of California may request that the mode of the user device be changed to a missing mode when the user device moves outside of California. In other embodiments, rather than automatically changing the device mode to a missing mode when the user device moves outside of a specific geographic area or a predefined distance from a certain location, a current user is first requested to provide data (e.g., a password or a code) confirming that he or she is a rightful owner of the user device. If an appropriate confirmation is not provided, then the device mode is changed to a missing mode.

At block 504, the server communicates with the missing user device and instructs it to disable access to the content stored on the user device and, in one embodiment, to disable the remaining functionality of the user device, except for a set of functions facilitating return of the user device to its owner such as functions allowing a current user to connect to the customer service, to receive messages enabling the return of the user device to its owner, to change the mode of the user device to a transit mode, and so on. The server may communicate with the user device upon remotely connecting to the user device (e.g., via a wireless network if the user device is in the wireless mode) or by waiting until the user device attempts to connect to the server (e.g., when the user device periodically calls "home"). In addition, at block 506, the server may also send to the user device a message that facilitates return of the user device to its owner. The message may indicate that this user device has been reported as lost or stolen and can specify a return address, which may be the address of the device owner or the address of an intermediate entity. In addition, the message may optionally specify a reward for the return of the user device to the device owner. The reward may be predefined or configured by the device owner.

At block 508, the server determines a current location of the user device using triangulation or other location detection techniques or by requesting it from the user device which can determine its location using a local GPS system, triangulation, MCC and MNC data, etc. At block 510, the server identifies a shipping carrier office (e.g., a UPS office, a FedEx office, or a US post office) near the current location of the user device. Then, the server generates a mailing label for the identified mailing carrier office (block 512), and delivers the mailing label for use in the shipment of the user device (block 514). The server may send the label to the user device (e.g., for display on the screen of the user device), to an email address provided by the user who found the user device, to the identified shipping carrier office so that they can print it and have it ready for shipment of the user device, etc.

In some embodiments, the server may be unable to communicate with the user device upon receiving an indication that the user device is missing. For example, the user device may be in critical battery state or tuned off when the owner reports that his or her user device has been lost or stolen. In such embodiments, prior to downloading content or providing any other service (previously requested or purchased) to the user device, the server verifies whether the user device is in a missing mode. If not, the server downloads the requested content or provides a requested service to the user device. If so, the server does not perform the above operation but rather instructs the user device to disable its functionality (except for a set of functions facilitating return of the user device to its owner) and sends a message that facilitates return of the user device to its owner, as discussed above.

Figure 5B:
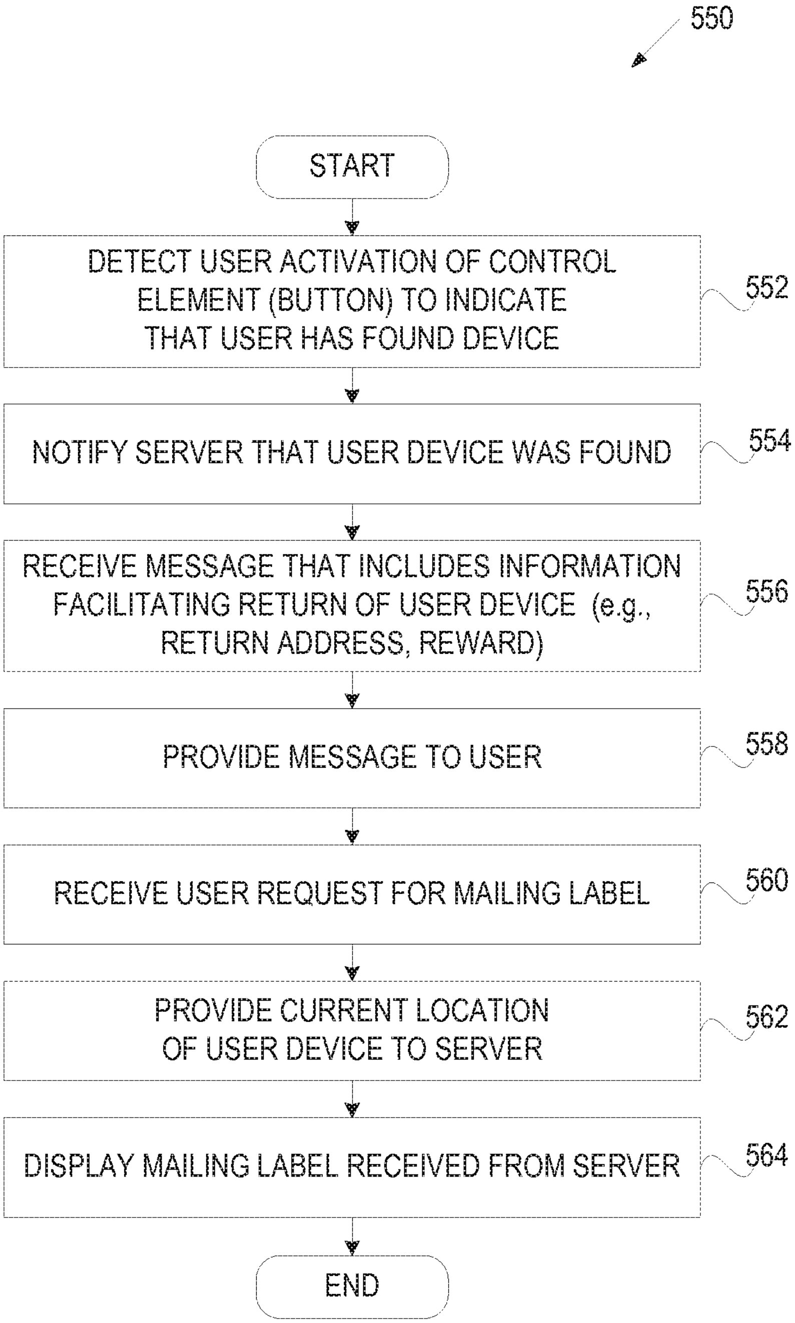
FIG. 5B is a flow diagram of one embodiment of a client-based method for facilitating return of a missing user device to a device owner.

FIG. 5B is a flow diagram of one embodiment of a client-based method 550 for facilitating return of a user device. In one embodiment, the method 550 is performed by a user device (e.g., user device 102 of FIG. 1).

Referring to FIG. 5B, method 550 beings with the user device detecting a user activation of a control element (e.g., a button, a key, a menu item) to indicate that the user has found this user device (block 552). At block 554, the user device notifies a server (e.g., item providing system) that the user has found the user device.

At block 556, the user device receives a message that includes information facilitating return of the user device to its rightful owner. This information may ask the user to return the user device, specify a return address (e.g., the address of the owner or an intermediate entity) and offer a reward for the return of the user device. At block 558, the user device provides this message to the user (e.g., as a text message, an audio message or video message).

At block 560, the user device receives a user request for a mailing label (e.g., upon a user activation of a designated button, menu option or some other control element). In another embodiment, the user does not need to request a mailing label as it is provided automatically by the server. At block 562, the user device provides the current location of the user device to the server. The user device may determine its current location using GPS, triangulation, MCC and MNC data, etc. In another embodiment, the current location of the user device is determined by the server, and the user device does not need to provide it to the server.

At block 564, the user device displays the mailing label to the user. In addition, the user device may display the location of the nearest shipping carrier office, which may be identified by the user device or provided by the server. In yet another embodiment, the mailing label is provided to the user via email or is sent directly to the shipping carrier office.

In one embodiment, prior to shipping the user device, the user changes the user device mode to a transit mode by, for example, selecting a designated control element (e.g., a button, a menu item, a key). In response, the user device notifies the server that the user device mode has been changed to a transit mode.

Figure 6A:
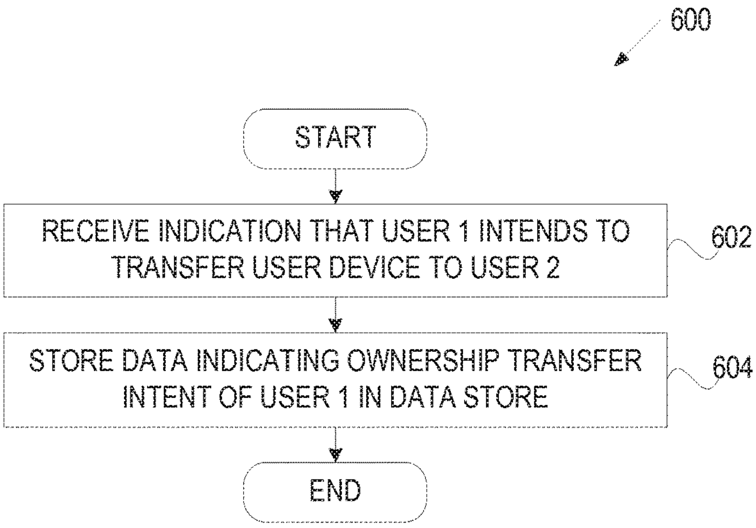
FIG. 6A is a flow diagram of one embodiment of a method for maintaining records of ownership of user devices.

FIG. 6A is a flow diagram of one embodiment of a method 600 for maintaining records of ownership of user devices. In one embodiment, the method 600 is performed by a server (e.g., item providing system 104 of FIG. 1).

Referring to FIG. 6A, method 600 begins with the server receiving an indication that user 1 intends to transfer a user device to user 2 (block 602). User 1 (a current owner of the user device) can provide this indication by, for example, disabling the missing device mode for a predefined time period (e.g., 3 weeks) (by selecting a relevant option on the screen of the user device or by connecting to the website of the item providing system), registering the transfer at a designated website and providing identifying information for user 2 (a new owner) such as an email address of user 2, registering the transfer and receiving a code associated with the transfer, or by any other means.

At block 604, the server stores data indicating the ownership transfer intent of user 1 in a data store. This data may include an identifier of a user device being transferred, an identifier of user 1, and optionally an identifier (e.g., email address) of user 2 or a transfer code associated with the transfer.

In one embodiment, user 1 provides user 2 with verification data which will enable user 2 to confirm that user 1 is a rightful owner of the user device and/or that user 1 has recorded the intended ownership transfer with respect to the user device. The verification data may be a transfer code generated for user 1 when user 1 registers the intended transfer at a designated website or the identifier of the user device (e.g., the serial number of the user device). User 2 may then use the verification data prior to initiating a payment for purchasing the user device from user 1. Hence, a mechanism is provided that allows a buyer of a user device to verify, prior to paying for the user device, that a seller of the user device is a rightful owner of the user device and that the user device is in an operational mode (as opposed to a missing mode that causes the user device to be disabled).

Figure 6B:
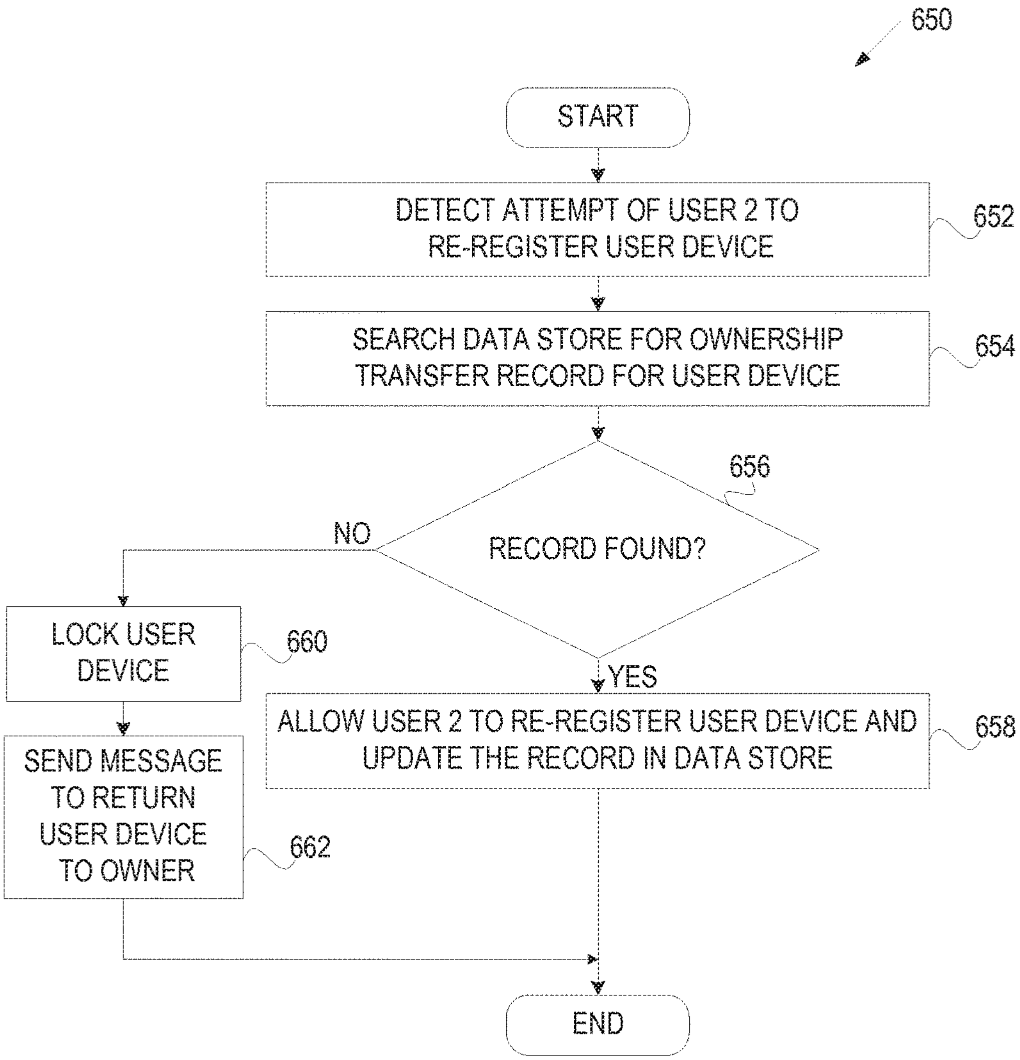
FIG. 6B is a flow diagram of one embodiment of a method for monitoring a transfer of ownership of a user device.

FIG. 6B is a flow diagram of one embodiment of a method 650 for monitoring a transfer of ownership of a user device. In one embodiment, the method 650 is performed by a server (e.g., item providing system 104 of FIG. 1).

Referring to FIG. 6B, method 650 begins with the server detecting an attempt of user 2 to re-register a user device in his or her name (e.g., by user 2 selecting a relevant option on the screen of the user device or connecting to a website of the item providing system via a personal computer). At block 654, the server searches a data store for an ownership transfer record associated with the user device. In one embodiment, prior to performing the search, the server asks user 2 to provide identifying information (e.g., email address) or a code associated with this transfer of ownership. If a relevant record specifying transfer of ownership with respect to the user device is found in the data store (block 656), the server allows user 2 to re-register the user device and updates the data store to record that the user device is now owned by user 2 (block 658).

If a relevant record specifying transfer of ownership with respect to the user device is not found in the data store (block 656), the server communicates with the user device to lock the user device (block 660) and sends a message to the user device identifying the user device as missing and asking user 2 to return the user device to its rightful owner (block 662). In some embodiments, prior to performing blocks 660 and 662, the server instructs the user device to ask user 2 for information (e.g., account information, password and the like) that would verify whether user 2 is a rightful owner of the user device or not. If the information provided by user 2 confirms that user 2 is not the rightful owner of the user device, the server performs blocks 660 and 662. Otherwise, the server allows user 2 to re-register the user device and updates the data store to record that the user device is now owned by user 2 (block 658).

Figure 7:
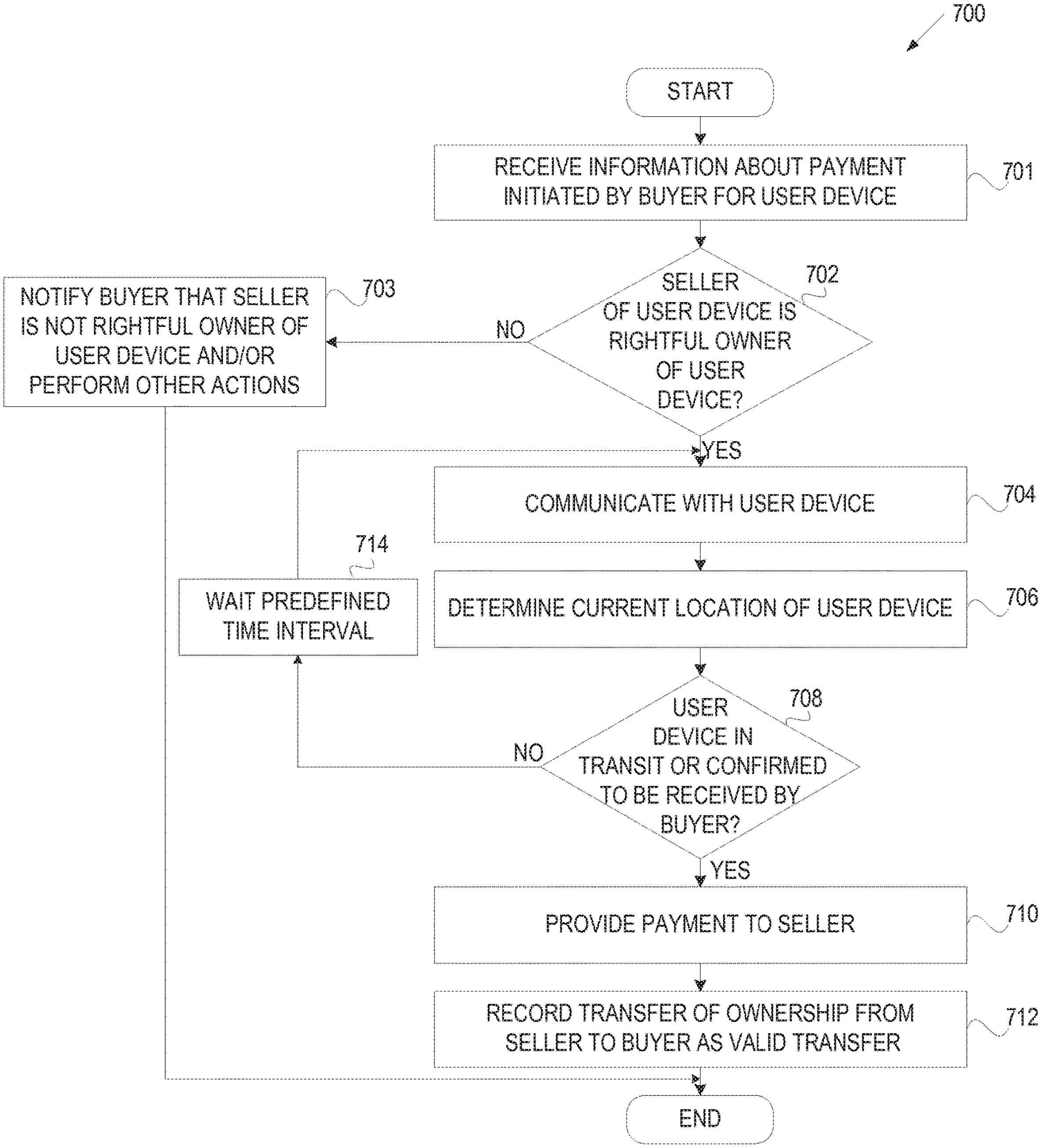
FIG. 7 is a flow diagram of one embodiment of a method for facilitating a valid transfer of ownership of a user device.

FIG. 7 is a flow diagram of one embodiment of a method 700 for facilitating a valid transfer of ownership of a user device. In one embodiment, the method 700 is performed by a server (e.g., item providing system 104 of FIG. 1).

Referring to FIG. 7, method 700 begins with the server receiving information about a payment initiated by a buyer of a user device to a seller of the user device (block 701) and processing the payment information (e.g., holding the payment in an escrow account, performing authorization against the buyer credit card, and the like). In one embodiment, upon receiving the payment information, the server checks the ownership transfer data store to verify that the seller of the user device is the rightful owner of the user device (block 702. If not, the server notifies the buyer about it and/or performs other actions to prevent sale of a lost or stolen user device (block 703), and method 700 ends. If so, method 700 proceeds to block 704.

At block 704, the server communicates with the user device (upon remotely connecting to the user or waiting until the user device calls home). At block 706, the server determines the current location of the user device (e.g., using triangulation or requesting its current location from the user device). At block 708, the server determines whether the user device is in transit or whether the buyer has confirmed receipt of the user device. This determination can be made based on the current location of the user device and/or the mode of the user device (e.g., transit mode) or upon receiving an indication that the buyer has received the user device (e.g., by the buyer providing the indication via the website of the item providing system, the phone, email or any other means). If so, the server provides a payment to the seller of the user device and updates the ownership transfer data store to specify that the transfer of the user device from the seller to the buyer is a valid transfer of ownership. If the user device is not in transit yet, the method returns to block 704.

Figure 8:
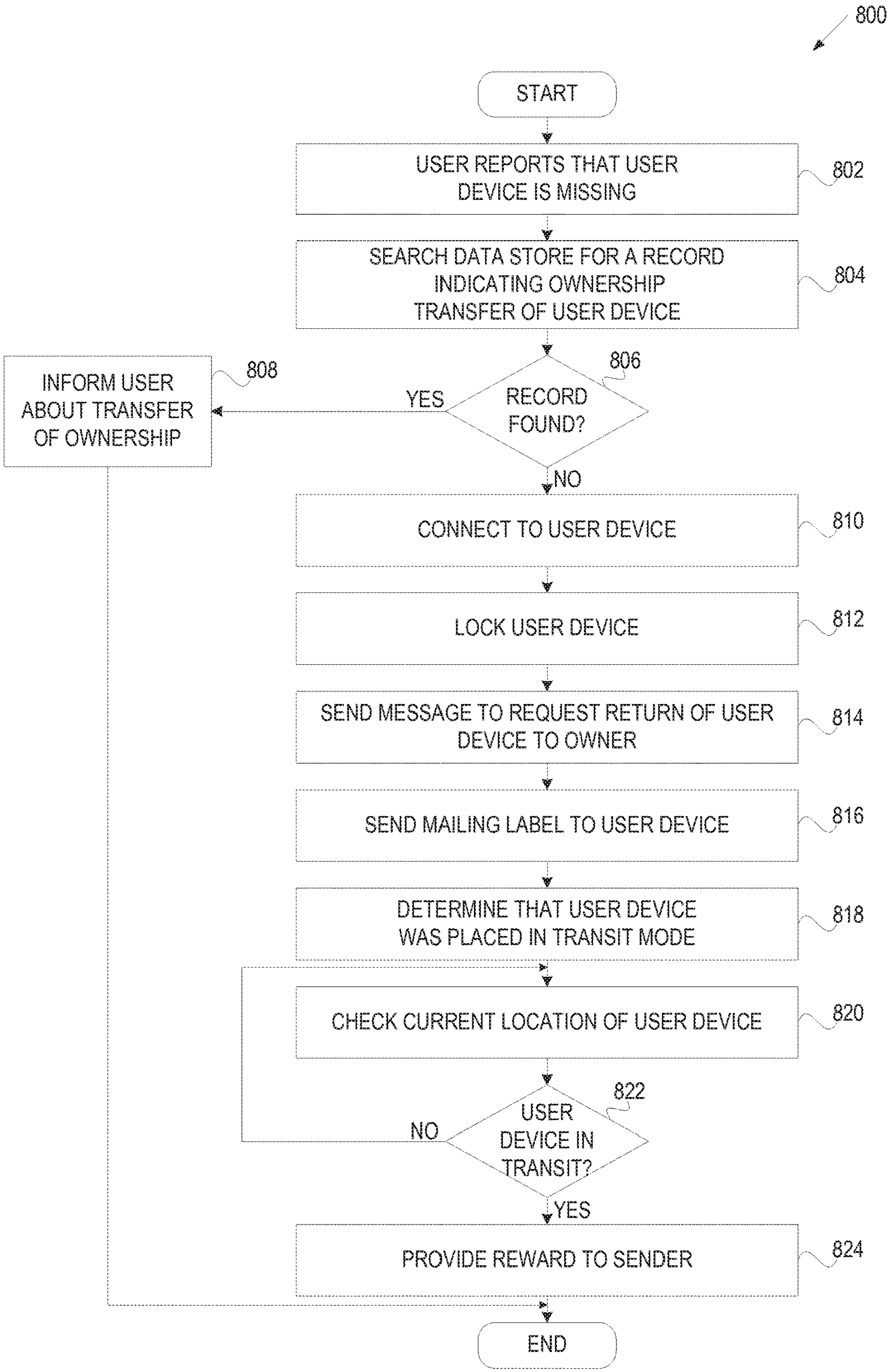
FIG. 8 is a flow diagram of another embodiment of a method for facilitating return of a missing user device to a device owner.

FIG. 8 is a flow diagram of another embodiment of a method 800 for facilitating return of a missing user device to a device owner. In one embodiment, the method 800 is performed by a server (e.g., item providing system 104 of FIG. 1).

Referring to FIG. 8, method 800 starts when a user reports that his or her user device is missing (block 802). At block 804, the sever searches a data store for a record indicating a transfer of ownership with respect to the user device. If such a record is found (block 806), the server informs the user about this transfer (block 808) and method 800 ends. If not, the server connects to the user device or waits for the user device to call home (block 810), instructs the user device to disable access to the content stored on the user device (block 812), and sends to the user device a message that facilitates return of the user device to its owner (block 814). The message may indicate that this user device has been reported as lost or stolen and can specify a return address, which may be the address of the device owner or the address of an intermediate entity. In addition, the message may optionally specify a reward for the return of the user device to the device owner. At block 816, the server delivers the mailing label for use in the shipment of the user device. The server may send the label to the user device (e.g., for display on the screen of the user device), to an email address provided by the user who found the user device, to the identified shipping carrier office so that they can print it and have it ready for shipment of the user device, etc.

Further, at block 818, the server determines that the user device has been placed in a transit mode (e.g., in response to a change in the device mode). At block 820, the server checks the current location of the user device. At block 822, the server determines whether the current location of the user device verifies that the user device is in a transit mode. If so, the server provides the reward to the user who found the user device (block 824). If not, method 800 returns to block 820.

Figure 9:
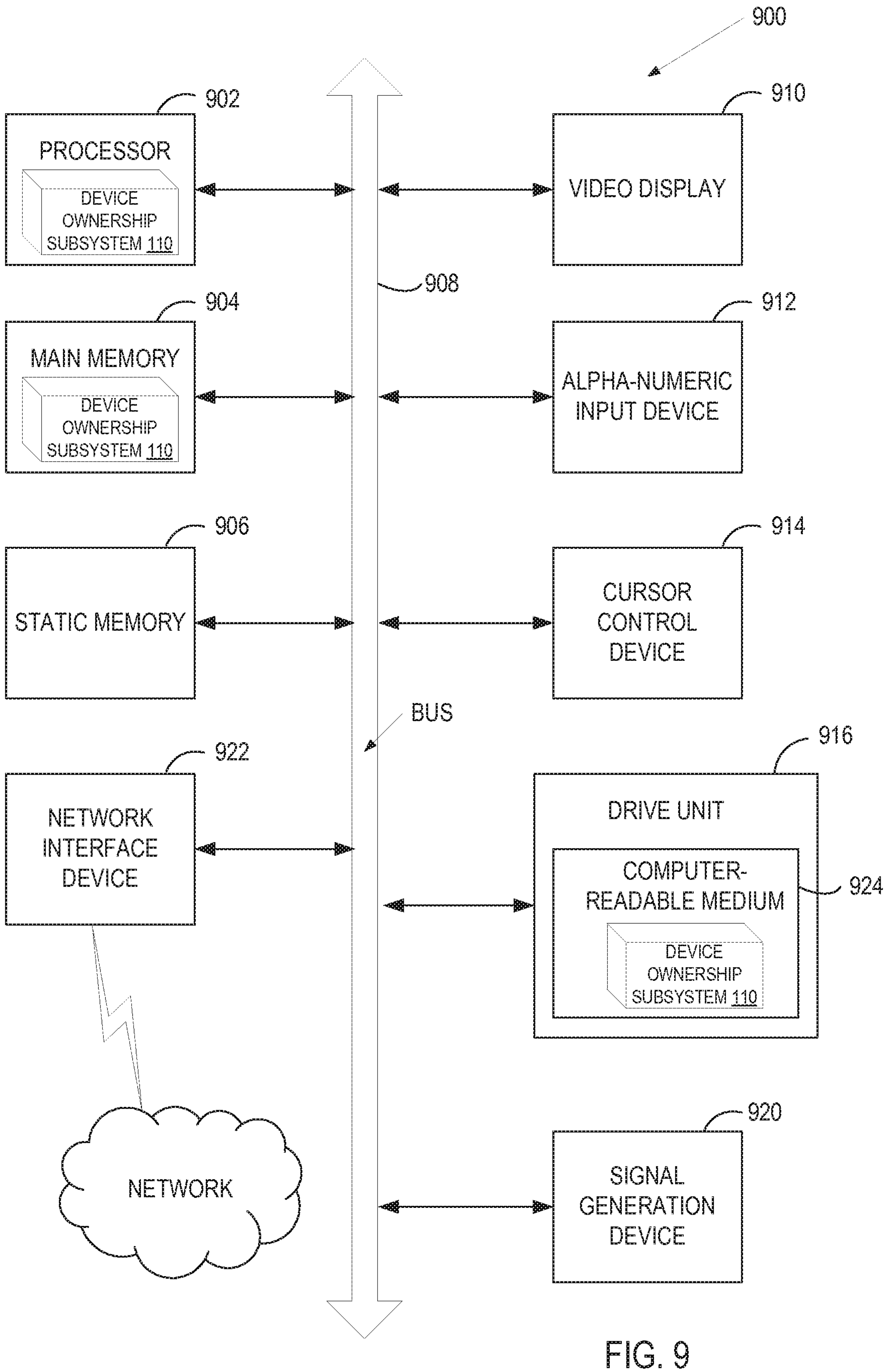
FIG. 9 illustrates an exemplary item providing system.

FIG. 9 illustrates an exemplary item providing system 900 (such as item providing system 104 of FIG. 1) in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing system (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 916, which communicate with each other via a bus 908.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute the device ownership subsystem 110 for performing the operations and steps discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 916 may include a computer-readable medium 924 on which is stored one or more sets of instructions (e.g., instructions of device ownership subsystem 110) embodying any one or more of the methodologies or functions described herein. The device ownership subsystem 110 may also reside, completely or at least partially, within the main memory 904 and/or within the processor 902 during execution thereof by the computer system 900, the main memory 904 and the processor 902 also constituting computer-readable media. The device ownership subsystem 110 may further be transmitted or received over a network via the network interface device 922.

While the computer-readable storage medium 924 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "communicating", "receiving", "changing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

detecting, by a processor, that a transfer of ownership of a user device from a first user to a second user has occurred, wherein detecting that the transfer of ownership has occurred comprises detecting that the second user is attempting to re-register the user device in a name of the second user via a user interface;

determining, by the processor in response to the detecting, whether the transfer of ownership was intended by the first user, wherein determining whether the transfer of ownership was intended by the first user comprises receiving an indication that the first user has disabled a missing mode of the user device, the missing mode causing access to content stored on the user device to be disabled when the transfer of ownership was not intended by the first user;

responsive to receiving the indication that the missing mode is disabled to determine that the transfer of ownership was intended by the first user, permitting the second user via the user interface to re-register the user device in the name of the second user; and responsive to determining that the transfer of ownership was not intended by the first user, performing the following comprising:

changing a mode of the user device to the missing mode;

sending a command to an agent executed by the user device to disable access to the content stored on the user device; and sending to the user device a message that facilitates return of the user device to the first user, wherein the message is to be presented by the user device and comprises a return address.

2. The method of claim 1, further comprising:

receiving an indication that the first user intends to transfer ownership of the user device;

storing intent data indicating an intent of the first user to transfer ownership;

determining that the transfer of ownership was intended by the first user utilizing the intent data; and recording the transfer of ownership of the user device from the first user to the second user as a valid transfer in response to determining that the transfer of ownership was intended by the first user.

3. The method of claim 2, wherein storing the intent data comprises:

in response to receiving the indication that the first user intends to transfer ownership of the user device, generating a first transfer code for the transfer, storing the first transfer code in a database, and sending the first transfer code to the first user.

4. The method of claim 3, wherein determining that the transfer of ownership was intended by the first user comprises:

transmitting a request for the second user to provide a second transfer code;

receiving the second transfer code from the second user; and comparing the second transfer code with the first transfer code.

5. The method of claim 2, wherein storing the intent data comprises:

in response to receiving the indication that the first user intends to transfer ownership of the user device to the second user, requesting first identifying information of the second user, receiving the first identifying information, and storing the first identifying information in a database.

6. The method of claim 5, wherein determining whether the transfer of ownership was intended by the first user comprises:

transmitting a request for the second user to provide second identifying information;

receiving the second identifying information; and comparing the second identifying information with the first identifying information.

7. The method of claim 1, further comprising:

determining a current location of the user device;

determining a location of a shipping facility near the current location of the user device, wherein the location of the shipping facility is included in the message;

generating a mailing label for shipment of the user device to the return address; and providing the mailing label to at least one of the user device, the shipping facility or an email address of the second user.

8. The method of claim 1, wherein the message indicates a reward to be paid for a return of the user device, the method further comprising:

determining whether the user device is in transit based on at least one of a current location of the user device or a transit mode of the user device; and responsive to determining that the user device is in transit, transferring the reward to the second user.

9. The method of claim 1, wherein the return address is an address of an intermediate entity.

10. The method of claim 1, further comprising:

sending a command to the agent of the user device to disable additional features of the user device along with disabling access to the content stored on the user device, wherein the additional features and the access to the content stored on the user device represent most functionality of the user device except for features facilitating the disabling of the access to the content stored on the user device and features facilitating return of the user device to an owner, the features facilitating return of the user device to the owner comprising at least one of: receiving the message, presenting the message on a screen of the user device, connecting to a customer service, changing the mode of the user device, receiving a mailing label for use in returning the user device, presenting the mailing label on the screen of the user device, or providing a location of the user device.

11. A non-transitory computer-readable medium having instructions encoded thereon which, when executed by a processor, cause the processor to:

detect that a transfer of ownership of a user device from a first user to a second user has occurred, wherein detecting that the transfer of ownership has occurred comprises detecting that the second user is attempting to re-register the user device in a name of the second user;

determine, in response to the detecting, whether the transfer of ownership was intended by the first user, wherein determining whether the transfer of ownership was intended by the first user comprises receiving an indication that the first user has disabled a missing mode of the user device, the missing mode causing access to content stored on the user device to be disabled when the transfer of ownership was not intended by the first user;

responsive to receiving the indication that the missing mode is disabled to determine that the transfer of ownership was intended by the first user, permit the second user to re-register the user device in the name of the second user; and responsive to determining that the transfer of ownership was not intended by the first user, perform the following comprising:

change a mode of the user device to the missing mode;

send a command to an agent executed by the user device to disable access to the content stored on the user device; and send to the user device a message that facilitates return of the user device to the first user, wherein the message is to be presented by the user device and comprises a return address.

12. The non-transitory computer-readable medium of claim 11, wherein the instructions, when executed by the processor, cause the processor further to:

receive an indication that the first user intends to transfer ownership of the user device;

store intent data indicating an intent of the first user to transfer ownership;

determine that the transfer of ownership was intended by the first user utilizing the intent data; and record the transfer of ownership of the user device from the first user to the second user as a valid transfer in response to determining that the transfer of ownership was intended by the first user.

13. A system comprising:

a memory;

a processor coupled to the memory, the processor to:

detect that a transfer of ownership of a user device from a first user to a second user has occurred by detecting that the second user is attempting to re-register the user device in a name of the second user;

determine, in response to detecting that the transfer of ownership has occurred, whether the transfer of ownership was intended by the first user by receiving an indication that the first user has disabled a missing mode of the user device, the missing mode causing access to content stored on the user device to be disabled when the transfer of ownership was not intended by the first user;

responsive to receiving the indication that the missing mode is disabled to determine that the transfer of ownership was intended by the first user, permit the second user to re-register the user device in the name of the second user; and responsive to determining that the transfer of ownership was not intended by the first user, perform the following comprising:

change a mode of the user device to the missing mode;

sending a command to an agent executed by the user device to disable access to the content stored on the user device; and send to the user device a message that facilitates return of the user device to the first user, wherein the message is to be presented by the user device and comprises a return address.

14. The system of claim 13, the processor further to:

receive an indication that the first user intends to transfer ownership of the user device;

store intent data in the memory indicating an intent of the first user to transfer ownership; and determine that the transfer of ownership was intended by the first user utilizing the intent data; and record the transfer of ownership of the user device from the first user to the second user as a valid transfer in response to determining that the transfer of ownership was intended by the first user.

15. The system of claim 14, wherein storing the intent data comprises:

in response to receiving the indication that the first user intends to transfer ownership of the user device, generating a first transfer code for the transfer, storing the first transfer code in a database, and sending the first transfer code to the first user.

16. The system of claim 15, wherein determining whether the transfer of ownership was intended by the first user comprises:

transmitting a request for the second user to provide a second transfer code;

receiving the second transfer code from the second user; and comparing the second transfer code with the first transfer code.

17. The system of claim 14, wherein storing the intent data comprises:

in response to receiving the indication that the first user intends to transfer ownership of the user device to the second user, requesting first identifying information of the second user, receiving the first identifying information, and storing the first identifying information in a database.

18. The system of claim 17, wherein determining whether the transfer of ownership was intended by the first user comprises:

transmitting a request for the second user to provide second identifying information;

receiving the second identifying information from the second user; and comparing the second identifying information with the first identifying information.

19. The system of claim 13, wherein the processor is further to:

determine a current location of the user device;

determine a location of a shipping facility near the current location of the user device, wherein the location of the shipping facility is included in the message;

generate a mailing label for shipment of the user device to the return address; and provide the mailing label to at least one of the user device, the shipping facility or an email address of the second user.

20. The system of claim 13, wherein the message indicates a reward to be paid for a return of the user device, and wherein the processor is further to:

determine whether the user device is in transit based on at least one of a current location of the user device or a transit mode of the user device; and responsive to determining that the user device is in transit, transfer the reward to the second user.

* * * * *